Nov. 19, 1946.  G. R. LAKE  2,411,437
RECOVERY OF AQUEOUS AZEOTROPE FORMER IN OZEOTROPIC
DISTILLATION OF HYDROCARBONS
Filed Oct. 18, 1941  2 Sheets-Sheet 1

INVENTOR
GEORGE R. LAKE.
BY Ross J. Garofalo
ATTORNEY

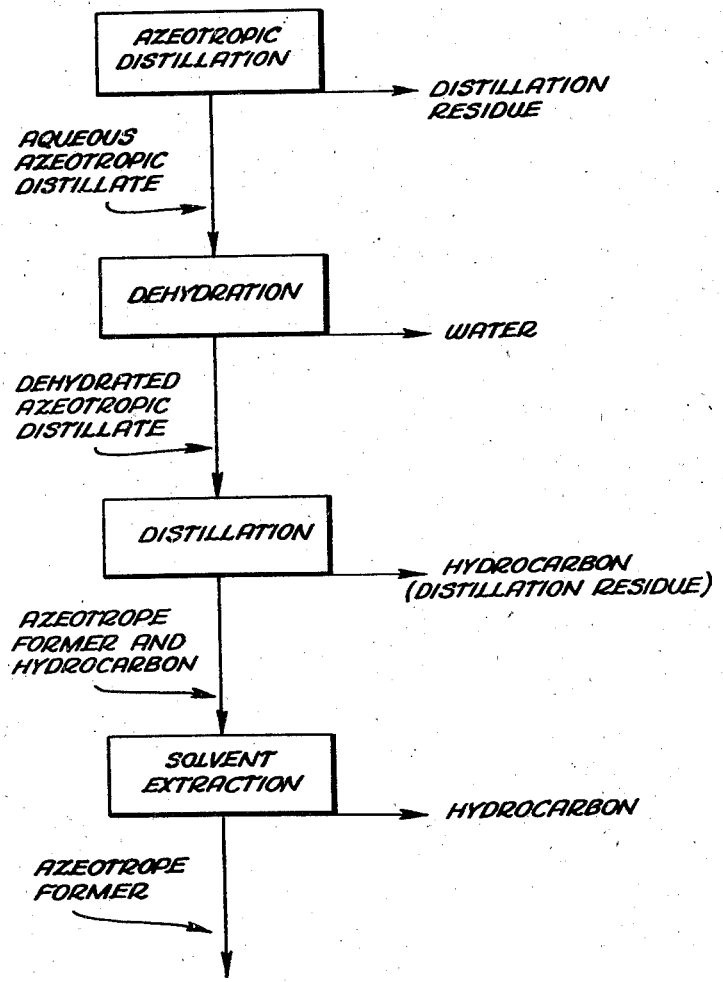

Patented Nov. 19, 1946

2,411,437

UNITED STATES PATENT OFFICE 2,411,437

RECOVERY OF AQUEOUS AZEOTROPE FORMER IN AZEOTROPIC DISTILLATION OF HYDROCARBONS

George R. Lake, Long Beach Calif., assignor to Union Oil Company of California, Los Angeles, Calif., a corporation of California Application October 18, 1941, Serial No. 415,568

8 Claims. (Cl. 202—42)

1

This invention relates to a process of azeotropic distillation to prepare pure hydrocarbons from complex petroleum fractions which are difficult to separate by ordinary fractional distillation due to the small differences in boiling points of the hydrocarbons contained in the petroleum fraction. The invention is particularly directed to an improved process for separating the hydrocarbons and the azeotrope former that are contained in the azeotropic distillate produced by the azeotropic distillation.

The process of separating one hydrocarbon component from another hydrocarbon component of substantially the same boiling point contained in a complex hydrocarbon fraction by azeotropic distillation is well known. This process consists in distilling the hydrocarbon fraction in the presence of an extraneous substance which has a preferential affinity for one of the components contained in the complex hydrocarbon fraction, thus causing a disturbance of the vapor pressure equilibrium that formerly existed in the fraction in such manner that the partial vapor pressure or fugacity of at least one component in the fraction is changed sufficiently to permit its separation by controlled fractional distillation. In such processes, the distillation effects the separation of the relatively more paraffinic hydrocarbons together with the extraneous substance leaving as undistilled bottoms the relatively less paraffinic hydrocarbons which may or may not contain a portion of the extraneous substance. In the present description of my invention, the aforesaid type of fractional distillation will be referred to as azeotropic distillation, the extraneous substance or substances which are added to the complex hydrocarbon fraction to effect the aforementioned change will be referred to as azeotrope formers and the overhead from the azeotropic distillation will be referred to as the azeotropic distillate.

One of the main difficulties in the azeotropic distillation process is in the separation or recovery of the azeotrope former from the hydrocarbons contained in the azeotrope distillate. One of the methods proposed for this purpose resides in washing the azeotropic distillate with water which is adapted to dissolve the azeotrope former from the azeotropic distillate and thus be separated from the hydrocarbons by settling and stratification. The solution of azeotrope former and water may be distilled to separate the azeotrope former from the water.

However, difficulty has been experienced to separate the azeotrope former substantially completely from the azeotropic distillate by washing

2 with water since in many cases, the azeotrope former has a preferential solubility in the hydrocarbons as compared with the solubility in the water. The result is that the hydrocarbons must be washed with an excessively large amount of water in order to remove the last traces of the azeotrope former so that the hydrocarbons may be utilized and the azeotrope former recovered without sustaining a substantial loss of this more valuable material. To illustrate, it has been found that methyl ethyl ketone containing water, i. e., about 10% by volume, is very efficient as an azeotrope former to effect the separation of non-aromatic hydrocarbons from a hydrocarbon fraction containing toluene. Yet the use of this azeotrope former offers the serious difficulty of recovering the methyl ethyl ketone from the azeotropic distillate. While the separation of the methyl ethyl ketone may be accomplished by washing with water, this has required about five or six volumes of water for each volume of azeotropic distillate. Furthermore, in order to recover the methyl ethyl ketone from the very dilute wash solution, it is necessary to heat an excessively large volume of dilute methyl ethyl ketone.

It is thus an object of my invention to effect a separation of the azeotrope former containing water as a constituent from the hydrocarbons contained in the azeotropic distillate and it is a particular object to effect the aforesaid separation in an efficient and economical manner.

It is a further object of my invention to effect the separation of the aqueous azeotrope former from the azeotropic distillate by first removing the water contained in the azeotropic distillate and then subjecting the dried azeotropic distillate to fractional distillation to remove the azeotrope former from the hydrocarbons. A further object is to effect the fractional distillation of the dried azeotropic distillate under temperature and pressure conditions which are different than those of the azeotropic distillation resulting in the production of the azeotropic distillate.

I have discovered that if the water contained in an azeotropic distillate which is produced by distilling a complex hydrocarbon fraction in the presence of an aqueous azeotrope former is removed from the azeotropic distillate, the latter may then be fractionally distilled and the remaining non-aqueous azeotrope former may be effectively separated from the hydrocarbons, whereas if the fractional distillation is carried out without removing the aqueous portion of the azeotrope former, an azeotrope consisting of the aqueous azeotrope former and hydrocarbons will be distilled in the same manner and composition as the azeotropic distillate was removed in the initial azeotropic distillation. However, by first dehydrating the azeotropic distillate, the composition of the remaining azeotropic distillate is modified sufficiently with respect to the partial vapor pressure of the constituents therein so that subsequent fractional distillation will prevent an azeotrope from distilling over and thus a separation of the azeotrope former from the hydrocarbons may be accomplished.

In other words, it has been found that certain compounds are very efficient azeotrope formers for the separation of hydrocarbons when employed in the absence of water, whereas other compounds are very efficient only in the presence of water to effect the desired separation and when employed in the absence of water merely distill from the hydrocarbon mixture without taking any of the hydrocarbon components overhead. Hence, when an azeotropic distillate which is produced by distilling a complex hydrocarbon fraction in the presence of such compound and water is first dehydrated, subsequent distillation under controlled conditions of the dehydrated azeotropic distillate results in the distillation of the azeotrope former without removing overhead any of the hydrocarbons in the same manner as when the distillation of the initial hydrocarbon fraction is effected in the presence of the azeotrope former and in absence of water.

Dehydration of the azeotropic distillate is accomplished by merely contacting the azeotropic distillate with a dehydrating agent which has a preferential affinity for water. Preferably this is accomplished by passing the azeotropic distillate through a bed of solid absorbent material which is adapted to absorb the water in preference to the organic materials contained in the azeotropic distillate. Solid materials adapted to absorb the water from the azeotropic distillate include activated clays, activated carbons, Activated Alumina, activated silica, cotton, also unactivated clays, carbons, aluminum, silica, etc.

Another method which may be employed for separating the water from the azeotropic distillate includes the use of solid water soluble compounds such as sodium chloride, calcium oxide and chloride, sodium and potassium carbonates, sulfates and hydroxides and metallic salts of pyrosulfuric and pyrophosphoric acids such as the pyrosulfates and pyrophosphates of potassium, sodium, zinc, calcium, mercury, silver, copper, etc. When using these dehydrating agents, the solid as it absorbs the moisture from the azeotropic distillate forms a solution of the dehydrating agent and water which during the process of passing the azeotropic distillate through the solid compounds, separates from the remaining solid compound and thus may be removed as a bottom layer from the drier.

Also, normally liquid materials may be employed as dehydrating agents for separating the water from the azeotropic distillate. Liquids which may be employed for this purpose include glycerine, polyglycols such as mono-, di-, triethylene and other glycols, sulfuric acid, etc. Dehydration with these materials may be accomplished by simply contacting the azeotropic distillate or bubbling the vaporized azeotropic distillate through a layer of the dehydrating liquid.

Dehydration of the azeotropic distillate may also be accomplished by chilling the distillate to a temperature sufficiently low to crystallize the aqueous portion of the distillate which may then be removed by settling, centrifuging or filtering the chilled mixture.

In general, the passage of the azeotropic distillate through the dehydrating agent is continued until the dehydrating agent is saturated with water and is no longer effective for removing further quantities of the water, whereupon the stream of azeotropic distillate is diverted to a fresh drier and the saturated dehydrating agent is regenerated. In the case of solid absorbents, regeneration is accomplished by blowing a heating gas, such as steam, air or inert gas through the drier containing the dehydrating agent until all of the water has been distilled from the dehydrating agent. In the case of the normally liquid absorbent, regeneration may be similarly accomplished or the saturated dehydrating agent may be fractionally distilled at a temperature above the boiling point of water as is well known by those skilled in the art. Where solid dehydrating agents are employed which form solutions in water, the separated aqueous solution may also be subjected to distillation to drive off the water contained in the solution.

The dehydrated azeotropic distillate consisting of the non-aromatic hydrocarbons and the azeotrope former is next subjected to fractionation in order to separate the hydrocarbon from the azeotrope former. Fractionation may be accomplished either at atmospheric, superatmospheric or under a vacuum but is preferably carried under subatmospheric conditions since these conditions result in effectively removing as an overhead product substantially all of the azeotrope former as a fraction substantially free from hydrocarbons. The overhead azeotrope former, if relatively free from hydrocarbons may be mixed with the proper quantity of water and returned to the azeotropic distillation step. In the event the thus separated azeotrope former contains a substantial portion of the hydrocarbons, this mixture may be condensed and then subjected to extraction with a selective solvent adapted to dissolve one of the components, either the azeotrope former or the hydrocarbons but not substantial quantities of the other component as will be described hereinafter.

Other objects, features and advantages of my invention will be apparent to those skilled in the art from the following description of the invention as taken from the accompanying drawings. In the drawings, Figure 1 represents a diagrammatic arrangement of apparatus for carrying out my invention and Figure 2 represents a simplified flow diagram showing the important process steps of the invention.

In the following example, the invention will be described as applied to the separation of toluene from a hydrocarbon fraction employing methyl ethyl ketone containing about 10% by volume of water as the azeotrope former and clay as the dehydrating agent. However, it will be observed that this example is not to be taken as limiting my invention since the process is applicable to separate other components from complex substances employing other azeotrope formers containing water under conditions adapted to effect the desired separation and other dehydrating agents.

In Figure 1, the hydrocarbon feed to be resolved into its component parts preferably one having a narrow boiling range, not more than 50° F., such as for example, a hydrocarbon fraction having a boiling range of about 200 to 240° F. and consisting of substantially 45% by volume of toluene, 6% by volume of olefins and the remainder paraffin and naphthene hydrocarbons obtained by fractionation of a catalytically reformed gasoline, is taken from tank 10 via line 11 and is pumped by pump 12 through line 14 controlled by valve 15 into line 16. Azeotrope former, such as methyl ethyl ketone, containing about 10% water, is taken from tank 17 via line 18 controlled by valve 19 and is pumped by pump 20 through lines 21 and 22 and valve 23 into line 16 where it is mixed with the hydrocarbon feed from tank 10. The mixture of hydrocarbon feed and azeotrope former in the ratio of approximately two parts of the azeotrope former and one part of hydrocarbon feed in the example herein given, is passed into fractionating column 24 where the mixture is subjected to fractionation, heat being supplied by closed steam coil 25. If desired, the azeotrope former may be introduced directly into the fractionating column at any other point as near the top of the column in which case it will act in part as reflux for the fractionation or reflux may be obtained by cooling coil 25a. In the fractionating column, the distillation is controlled so as to distill overhead an azeotrope consisting of the paraffin, olefin and naphthene hydrocarbons together with substantially all of the methyl ethyl ketone and water. In the example herein given, this is accomplished at an overhead temperature of approximately 160–170° F. and at atmospheric pressure. If desired, the azeotropic distillation may be carried out either at atmospheric or superatmospheric pressure or under a vacuum. Other azeotrope formers containing water which are effective for separating the relatively non-aromatic hydrocarbons from the relatively aromatic hydrocarbons include alcohols such as ethyl, normal and isopropyl, primary, secondary and tertiary butyl alcohols, other ketones such as diethyl ketone and methyl isobutyl ketone, dioxane, etc. The optimum amount of water to be employed with these azeotrope formers for efficient operation will vary from 5 to 25% by volume, depending upon the characteristics of the particular compound such as its boiling point.

The type of distillation to be used depends somewhat upon the quantity of the azeotrope former used. I may distill over any proportion of the petroleum fraction to be subjected to azeotropic distillation that I desire by adjusting the quantity of azeotrope former. Thus, by employing a relatively small proportion of the azeotrope former, it is possible to distill overhead a portion of the relatively non-aromatic hydrocarbons and leave a portion as bottoms with the relatively aromatic hydrocarbons, or by employing a relatively larger amount of the azeotrope former, it is possible to distill all of the relatively non-aromatic hydrocarbons and a portion of the relatively aromatic hydrocarbons, leaving relatively aromatic hydrocarbons as still bottoms.

The above overhead mixture is removed from the fractionating column via line 26, controlled by valve 27, condensed in condenser 28 and passed via line 29 into line 30 controlled by valve 30a to the methyl ethyl ketone-water recovery system, as will be described hereinafter. In some cases, depending upon the hydrocarbon feed and the character and composition of the azeotrope former, the azeotropic distillate obtained in line 26 will separate into two phases when properly cooled. In the case of the example herein described, cooling of the azeotropic distillate to about 50–70° F., the condensate will separate when allowed to settle into an upper phase comprising the bulk of the azeotropic distillate and consisting of substantially all of the hydrocarbons and most of the methyl ethyl ketone with some water and a lower phase consisting of substantially all of the water containing the remainder of methyl ethyl ketone. In such case, it is preferable to pass the cooled azeotropic condensate from condenser 28 through lines 29 and 31 controlled by valve 31a into a separator 32 where the mixture is allowed to stratify into the two layers. The lower layer is withdrawn via line 34 and may be passed by pump 32a via line 33 controlled by valve 33a to a recovery system for the recovery of the methyl ethyl ketone, as will be described hereinafter. Preferably, it is passed into line 22 where it may be mixed with methyl ethyl ketone introduced into line 22 as will be described hereinafter in such proportions as to produce an azeotrope former containing an optimum amount of water which mixture may then be recycled to the azeotropic distillate. The upper layer is withdrawn via line 35 and passed via line 30 to the methyl ethyl ketone recovery system.

The bottoms in the fractionating column 24 consisting of the aromatic fraction or toluene are withdrawn via line 36 controlled by valve 37 and are pumped by pump 38 through line 39. If the hydrocarbon feed to the azeotropic distillation has been carefully fractionated to produce a fraction free from aromatic hydrocarbons other than toluene and if the azeotropic distillation has been carried out under such conditions as to remove all of the non-aromatic hydrocarbons and azeotrope former, the bottoms from the fractionating column may be passed directly via lines 36, 39, 40 controlled by valve 41, lines 42, 43 controlled by valve 44 and line 45 into storage tank 46. However, in the event the charging stock has not been carefully fractionated to remove aromatic hydrocarbons heavier than toluene, such as xylene, etc., the bottoms in the fractionating column 24 will contain all or substantial amounts of such aromatic hydrocarbons. In the event it is desired to recover the aromatic hydrocarbon mixture per se, it is passed directly to tank 46 as described above. However, if it is desired to separate the toluene from the remaining aromatic hydrocarbons, the bottoms are passed via lines 36, 39, 40, 42 into line 47 controlled by valve 48 from which it passes through heater 49 and line 50 into fractionating column 51 where the mixture is fractionated to remove the toluene as an overhead product aided by heat from the heater 52. The vaporized toluene is removed from the top of the fractionating column 51 via line 53, condensed in condenser 54 and passed via line 55 into collecting tank 56. The condensate may be withdrawn from the collecting tank by pump 57 and passed into line 58. If desired, part of the condensate may be cycled via line 59 controlled by valve 60 to the fractionating column 51 to serve as reflux for the fractionation. The remaining portion is passed via line 61 controlled by valve 62 through line 45 into storage tank 46. The bottoms from the fractionating column, consisting of xylene or a mixture of xylene and higher boiling aromatic hydrocarbons, is withdrawn via line 63 controlled by valve 64 and pumped by pump 65 and line 66 into storage tank 67.

In the event the bottoms fraction from the fractionating column 24 contains a portion of the azeotrope former, this may be removed by passing the bottom fraction via lines 36, 39 and 68 controlled by valve 69 through heater 70 and line 71 into fractionating column 72 provided with a heater 73 and reflux cooling coil 74 where the azeotrope former may be fractionated and removed via line 75, condensed in condenser 76 and passed via line 77 into collecting tank 78 from which it may be returned to the fractionating column 24 by pump 79 and line 80 controlled by valve 81 and lines 22 and 16. The bottoms from the fractionating column 72 may be passed via line 82 controlled by valve 83 into line 42 from which it may be passed by pump 84 either directly to the storage tank 46 or to fractionating column 51 in accordance with the above disclosure.

The toluene or the mixture of toluene and higher boiling aromatic hydrocarbons obtained in tank 46 and the higher boiling aromatic hydrocarbons obtained in tank 67 may be treated with clay which may be accomplished at a temperature of about 230° F. employing 1 to 5 pounds of clay per barrel of the hydrocarbon fraction. If desired, the clay treatment may precede the fractionation in fractionating column 51 in which case the fractionation in 51 may serve either to rerun the clay treated stock and/or to fractionate the high boiling aromatic hydrocarbons from the toluene. In place of clay treatment, the aromatic fraction may be cooled and then treated with 1 to 10 pounds of sulfuric acid per barrel of the hydrocarbons followed by neutralization with clay or caustic alkali. The acid treatment serves to remove small traces of undesirable unsaturated hydrocarbons which may be detrimental in color stability and nitration of the toluene.

In order to recover the azeotrope former from the azeotropic distillate, the latter is passed into the bottom of either of the driers 85 through lines 86 and valves 87 which are packed with a clay adapted to remove the water contained in the distillate when passed upwardly in contact with the clay. If desired, the dehydration may be effected while the distillate is in the vapor phase and in this respect, the condenser 28 may be deleted or operated as a temperature regulator to adjust the temperature of the distillate vapor to the proper level for optimum operation in the drier. Preferably, the drying is accomplished by percolating upwardly a condensate of the azeotropic distillate through the clay.

The dehydrated azeotropic distillate is withdrawn from the driers 85 through valves 88 and line 89. Preferably the driers are operated alternately, one being employed until the dehydrating agent is saturated with water so that it is no longer effective to dehydrate the distillate, after which the distillate stream is diverted to the other drier and the saturated dehydrating agent is regenerated. Regeneration is accomplished by blowing a heated gas, such as steam, air or inert gas through the dehydrating agent which may be introduced via lines 90 controlled by valves 91. The regenerating gases and water separated from the dehydrating agent in the form of steam is removed from the driers 85 via lines 92 controlled by valves 93.

The dehydrated distillate passing through line 89 is heated in heater 94 and passed via line 95 into the fractionating column 96 which is provided with heater 97 and reflux cooling coil 98 where the methyl ethyl ketone is distilled from the non-aromatic hydrocarbons and withdrawn from the fractionating column via line 99. Fractionation in column 96 is preferably carried at a temperature of 75° F. and under an absolute pressure of 100 millimeters of mercury. The methyl ethyl ketone vapors may be passed via valve 100 into line 22 where it is mixed with the optimum amount of water such as obtained in line 34 and the mixture is passed via line 16 to the azeotropic distillation in fractionating column 24. When the overhead from the fractionating column 100 contains non-aromatic hydrocarbons and it is desired to separate them, the overhead may be passed via line 101 controlled by valve 102, condensed in condenser 103 and passed via line 104 into the bottom of an extractor 105 which is provided with packing material, such as broken tile 106, where the mixture is countercurrently contacted with a selective solvent adapted to extract the methyl ethyl ketone from the mixture. The selective solvent is obtained from tank 107 and passed via line 108 controlled by valve 109 and pumped by pump 110 into the extractor 105. As selective solvents adapted for the purpose, tetra ethylene glycol is particularly suitable when used in about two volumes to one of the hydrocarbon-methyl ethyl ketone mixture at about atmospheric temperature.

Besides tetra-ethylene glycol mentioned above, selective solvents which I have found suitable to effect the extraction of azeotrope formers from azeotropic distillates include phenolic compounds such as resorcinol, para-chlorophenol, phenol, xylenol, pyrogallol, pyrocatechol and cresylic acid, polyhydric alcohols such as di-, tri-, tetra- and hexaethylene glycols and dipropylene glycol, amines such as mono-, di- and tri-ethanolamine, 2-methyl propanol amine, diethylene triamine, triethylene tetramine, tetra-ethylene pentamine, diethylene diamine, tri-ethylene triamine, diphenylamine, xylidine, aniline, ortho phenylene diamine, alpha naphthol amine and phenyl hydrazine, fatty acids such as acetic, propionic and formic acids, aliphatic alcohols such as methyl, ethyl, isopropyl, tertiary butyl and normal propyl alcohols, ketones such as methyl ethyl ketone and acetone, cyclic ketones such as cyclohexanone, alkyl ethers of polyglycols such as mono ethyl ether of diethylene glycol and ethyl ether of ethylene glycol, heterocyclic compounds such as furfuryl alcohols, tetrahydro furfuryl alcohol, dioxane, morpholine, piperidine and thiophene, nitroparaffins such as nitromethane, nitroethane and nitropropane. In addition to the above, aromatic hydrocarbon solvents may be employed to effect the desired separation since the azeotrope formers have a greater affinity for these hydrocarbons than they have for the relatively non-aromatic hydrocarbons contained in the azeotropic distillate. Aromatic hydrocarbon solvents useful for the purpose include benzene, toluene, xylenes, etc. Of the above selective solvents, I have found the polyhydric alcohols such as di-, tri- and tetra ethylene glycols, amines such as mono- and tri-ethanolamine and di-ethylene triamine, and also resorcinol and nitromethane to be particularly efficient for extracting such azeotrope formers as methyl ethyl ketone and methanol from azeotropic distillates containing non-aromatic hydrocarbons having a boiling range of 200 to 240° F.

Instead of employing a selective solvent for the azeotrope former in order to separate it from the hydrocarbons, I may employ a solvent which is selective for the hydrocarbons and thus separate a solution of the solvent and hydrocarbons from the azeotrope former. Solvents adapted to accomplish this purpose include highly paraffinic hydrocarbons of high boiling point such as solvent refined lubricating oil fractions which have a greater affinity for the non-aromatic hydrocarbons than for azeotrope former. Also, low melting paraffin waxes and other paraffin hydrocarbons may be used for this purpose.

The non-aromatic hydrocarbons, if relatively free of methyl ethyl ketone are withdrawn from the top of the extractor 105 via line 111 controlled by valve 112 and are pumped by pump 114 into storage tank 115. Non-aromatic hydrocarbons separated in fractionating column 96 are withdrawn as bottoms via line 116 controlled by valve 117 and are passed by pump 118 into storage tank 115. The solution of selective solvent and methyl ethyl ketone is withdrawn via line 119 controlled by valve 120 and pumped by pump 121 through heater 122 into fractionating column 123 provided with heater 124 where the mixture is fractionated to separate the methyl ethyl ketone as an overhead vapor which may be passed via line 125 and valve 126 through lines 21, 22 and 16 into the fractionating column 24 or the overhead may be passed via line 127 controlled by valve 128, condensed in condenser 129 and collected in collecting tank 130. As indicated above, the lower layer in separator 32 passing through line 33 may also be passed into the fractionating column 123 for the recovery of the azeotrope former. The condensate is withdrawn from the bottom of the collecting tank by pump 131 and part thereof may be passed via line 132 controlled by valve 133 to fractionating column 123 to serve as reflux for the fractionation. The remaining portion of the condensate is passed via line 134 controlled by valve 135 into storage tank 17. The selective solvent is withdrawn from the bottom of the fractionating column 123 via line 136 controlled by valve 137 and is pumped by pump 138 through cooler 139 and line 140 to storage tank 107.

As disclosed above, the methyl ethyl ketone distilled as an overhead vapor in fractionating columns 96 and 123 may be passed to the azeotropic distillation in fractionating column 24 to serve as azeotrope former for the distillation. However, since the azeotropic distillation in 24 is preferably carried out in the presence of a mixture of 90% methyl ethyl ketone and 10% water, the overhead vapor from fractionating columns 96 and 123 will be relatively free of water and thus this overhead vapor must be adjusted to the proper water content by addition of water. In some cases, as described above, when the azeotropic distillate from 24 is cooled and separated in separator 32 and the bottom layer consists substantially of water, this bottom layer may be mixed with the overhead from fractionating column 96 and 123 to effect, in part, the desired adjustment of water content in the azeotrope former. Also, the water separated from driers 95 may be passed into line 22 to effect the above adjustment of water content.

The foregoing description of my invention is not to be taken as limiting my invention but only as illustrative thereof since many variations may be made by those skilled in the art without departing from the scope of the following claims.

I claim:

1. In a process for the treatment of a complex hydrocarbon fraction to separate chemically similar hydrocarbon components therefrom from other hydrocarbon components contained therein which ordinarily distill from the hydrocarbon fraction in the same temperature range as said chemically similar hydrocarbon components distilled therefrom which comprises distilling said complex hydrocarbon fraction in the presence of a sufficient amount of an azeotrope former and water to produce an azeotropic distillate consisting of at least one class of the chemically similar components contained in said complex hydrocarbon fraction together with said azeotrope former and water, thereby leaving at least one class of chemically similar components different from said chemically similar components contained in said azeotropic distillate contained in said complex hydrocarbon fraction in the residue, the steps of dehydrating said azeotropic distillate with a dehydrating agent, that bodily removes water separating the remaining azeotropic distillate from the dehydrating agent and water and fractionally distilling said dehydrated azeotropic distillate to separate the azeotrope former from hydrocarbons.

2. In a process for the treatment of a complex hydrocarbon fraction to separate chemically similar hydrocarbon components therefrom from other hydrocarbon components contained therein which ordinarily distill from the hydrocarbon fraction in the same temperature range as said chemically similar hydrocarbon components distilled therefrom which comprises distilling said complex hydrocarbon fraction in the presence of a sufficient amount of an azeotrope former and water to produce an azeotropic distillate consisting of at least one class of the chemically similar components contained in said complex hydrocarbon fraction together with said azeotrope former and water, thereby leaving at least one class of chemically similar components different from said chemically similar components contained in said azeotropic distillate contained in said complex hydrocarbon fraction in the residue, the steps of dehydrating said azeotropic distillate with a dehydrating agent, that bodily removes water separating the remaining azeotropic distillate from the dehydrating agent and water and fractionally distilling said dehydrated azeotropic distillate at a reduced pressure to separate the azeotrope former from hydrocarbons.

3. In a process for the treatment of a complex hydrocarbon fraction to separate it into component parts of dissimilar characteristics which comprises distilling said complex hydrocarbon fraction in the presence of a sufficient amount of an aqueous azeotrope former to produce an azeotropic distillate consisting of at least one of the components contained in said complex hydrocarbon fraction together with said azeotrope former and water, thereby leaving at least one of the components contained in said complex hydrocarbon fraction in the residue, the steps of dehydrating said azeotropic distillate with a dehydrating agent, that bodily removes water separating the dehydrated azeotropic distillate from the dehydrating agent and water, fractionally distilling said dehydrated azeotropic distillate to separate the azeotrope former together with a portion of hydrocarbons contained in said azeotropic distillate from remaining hydrocarbons and extracting said separated mixture with a selective solvent to separate said azeotrope former from said hydrocarbons.

4. In a process for the treatment of a complex hydrocarbon fraction to separate chemically similar hydrocarbon components therefrom from other hydrocarbon components contained therein which ordinarily distill from the hydrocarbon fraction in the same temperature range as said chemically similar hydrocarbon components distill therefrom, which comprises distilling said complex hydrocarbon fraction in the presence of a sufficient amount of an azeotrope former and water to produce an azeotropic distillate consisting of at least one class of the chemically similar components contained in said complex hydrocarbon fraction together with said azeotrope former and water, thereby leaving at least one class of chemically similar components, different from said chemically similar components contained in said azeotropic distillate, contained in said complex hydrocarbon fraction, in the residue, the steps of dehydrating said azeotropic distillate with a solid absorbent that bodily removes water, separating the remaining azeotropic distillate from the solid absorbent and water and separating the azeotrope former from hydrocarbons.

5. In a process for the treatment of a complex hydrocarbon fraction to separate chemically similar hydrocarbon components therefrom from other hydrocarbon components contained therein which ordinarily distill from the hydrocarbon fraction in the same temperature range as said chemically similar hydrocarbon components distill therefrom, which comprises distilling said complex hydrocarbon fraction in the presence of a sufficient amount of an azeotrope former and water to produce an azeotropic distillate consisting of at least one class of the chemically similar components contained in said complex hydrocarbon fraction together with said azeotrope former and water, thereby leaving at least one class of chemically similar components, different from said chemically similar components contained in said azeotropic distillate, contained in said complex hydrocarbon fraction, in the residue, the steps of dehydrating said azeotropic distillate with a solid absorbent that bodily removes water separating the dehydrated azeotropic distillate from the solid absorbent and water and fractionally distilling said dehydrated azeotropic distillate to separate the azeotrope former from hydrocarbons.

6. A process according to claim 4 in which said solid absorbent is clay.

7. A process according to claim 4 in which said solid absorbent is carbon.

8. A process according to claim 4 in which said solid absorbent is alumina.

GEORGE R. LAKE.